United States Patent [19]

Baum

[11] 3,879,749

[45] Apr. 22, 1975

[54] TV TEST PATTERN AND METHOD OF TESTING

[75] Inventor: Robert E. Baum, Dell Rapids, S. Dak.

[73] Assignee: Sencore, Inc., Sioux Falls, S. Dak.

[22] Filed: Aug. 20, 1973

[21] Appl. No.: 389,732

[52] U.S. Cl. .............. 358/10; 178/DIG. 4; 328/188

[51] Int. Cl. .............................................. H04n 9/00

[58] Field of Search .................. 178/5.4 TE, DIG. 4; 328/188; 358/10

[56] References Cited

UNITED STATES PATENTS

| | | | |
|---|---|---|---|
| 1,706,358 | 3/1929 | Mertz | 178/DIG. 4 |
| 1,706,538 | 3/1929 | Mertz | 178/DIG. 4 |
| 2,733,433 | 1/1956 | Morrison | 178/DIG. 4 |

FOREIGN PATENTS OR APPLICATIONS

| | | | |
|---|---|---|---|
| 996,919 | 9/1951 | France | 178/DIG. 4 |
| 731,198 | 2/1943 | Germany | 178/DIG. 4 |

OTHER PUBLICATIONS

Fink, Television Engineering Handbook, 1st Ed., 1957, pp. 3–12 to 3–17, 17–2 to 17–5.

Radio–Electronics, pp. 87–92, March 1958.

Radio & Television News, pp. 50, 51, 110, Oct. 1956.

*Primary Examiner*—Robert L. Richardson
*Attorney, Agent, or Firm*—Edmond T. Patnaude

[57] ABSTRACT

A test pattern generator electronically generates a wave form comprising a plurality of equal amplitude, discrete video frequencies at strategic points on the I.F. response curve, which frequencies are in synchronism with the horizontal sync pulses provided in the wave form so that application of the wave form to the receiver produces a plurality of horizontal lines on the screen of the receiver to visually show the alignment and other characteristics thereof.

10 Claims, 4 Drawing Figures

TV TEST PATTERN AND METHOD OF TESTING

The present invention relates to methods and apparatus for testing television receivers, and it relates more particularly to a new and improved waveform for developing a test pattern, to a novel circuit for generating said waveform, and to a novel method of testing a television receiver by the use of said waveform.

BACKGROUND OF THE INVENTION

Since television was first introduced, the need for a test pattern was evident and most television stations transmitted a standard test pattern in the early morning and late evening hours. Such a pattern, which was displayed directly on the screen of the television receiver, enabled the technicians to determine receiver alignment, linearity and gray scale range. Some stations still transmit such a signal during the early morning hours, but because of the time of its transmission it is inconvenient to use.

Test pattern generators for use by shops have also been marketed. Closed circuit television could also be used for this purpose. However, the presently available test pattern generators are either expensive or do not provide sufficient accuracy. The cost of a closed circuit system for providing a television test pattern would also be very expensive.

SUMMARY OF THE PRESENT INVENTION

In accordance with a preferred embodiment of the present invention there is provided a novel circuit for generating a test pattern signal made up of a plurality of bands of discrete video frequencies respectively representing critical or strategic points on the standard I.F. response curve of a television receiver. The amplitudes of the signals in each band are such that when the signal is applied to the input of the receiver the test pattern developed on the screen will shown an even intensity for all bands if the receiver is properly aligned. Preferably, the test signal also includes a relatively low video frequency band to establish on the screen large areas of black and white for visual reference. An additional band having no signal establishes the gray reference. By selecting frequencies which are synchronized with or locked to the horizontal or vertical sweep frequency the pattern also provides a good visual indication of resolution. Moreover, the bands are all the same width whereby the alignment, gray scale range and sweep linearity of the receiver can be determined by simply observing the test pattern on the screen of the receiver. Other features and methods of use of this novel test signal are hereinafter described.

BRIEF DESCRIPTION OF THE DRAWINGS

Further objects and advantages and a better understanding of the invention may be had from the following detailed description taken in connection with the accompanying drawings, wherein.

DETAILED DESCRIPTION OF THE INVENTION

Figure 1:
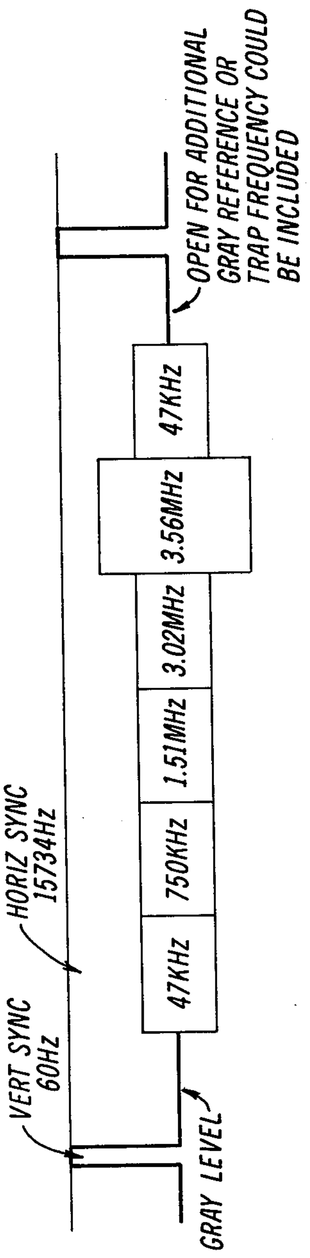
FIG. 1 is an illustration of a novel television test pattern signal waveform embodying the present invention.
Figure 2:
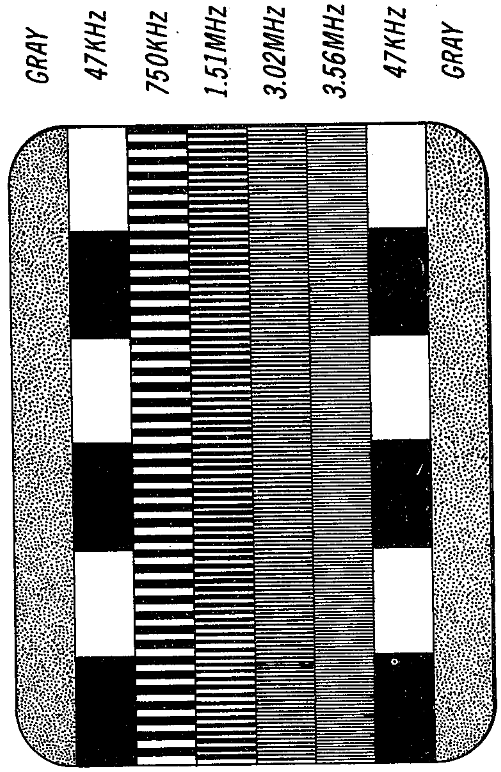
FIG. 2 shows the test pattern of the present invention as it appears on the screen of a properly tuned television receiver.
Figure 3:
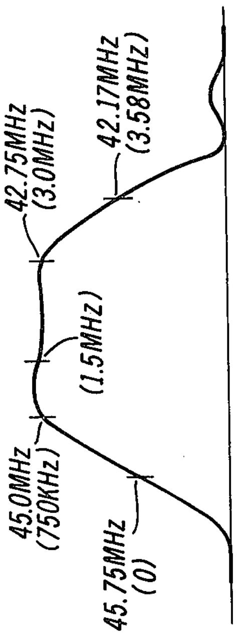
FIG. 3 shows the typical I.F. response curve of a television receiver.
Figure 4:
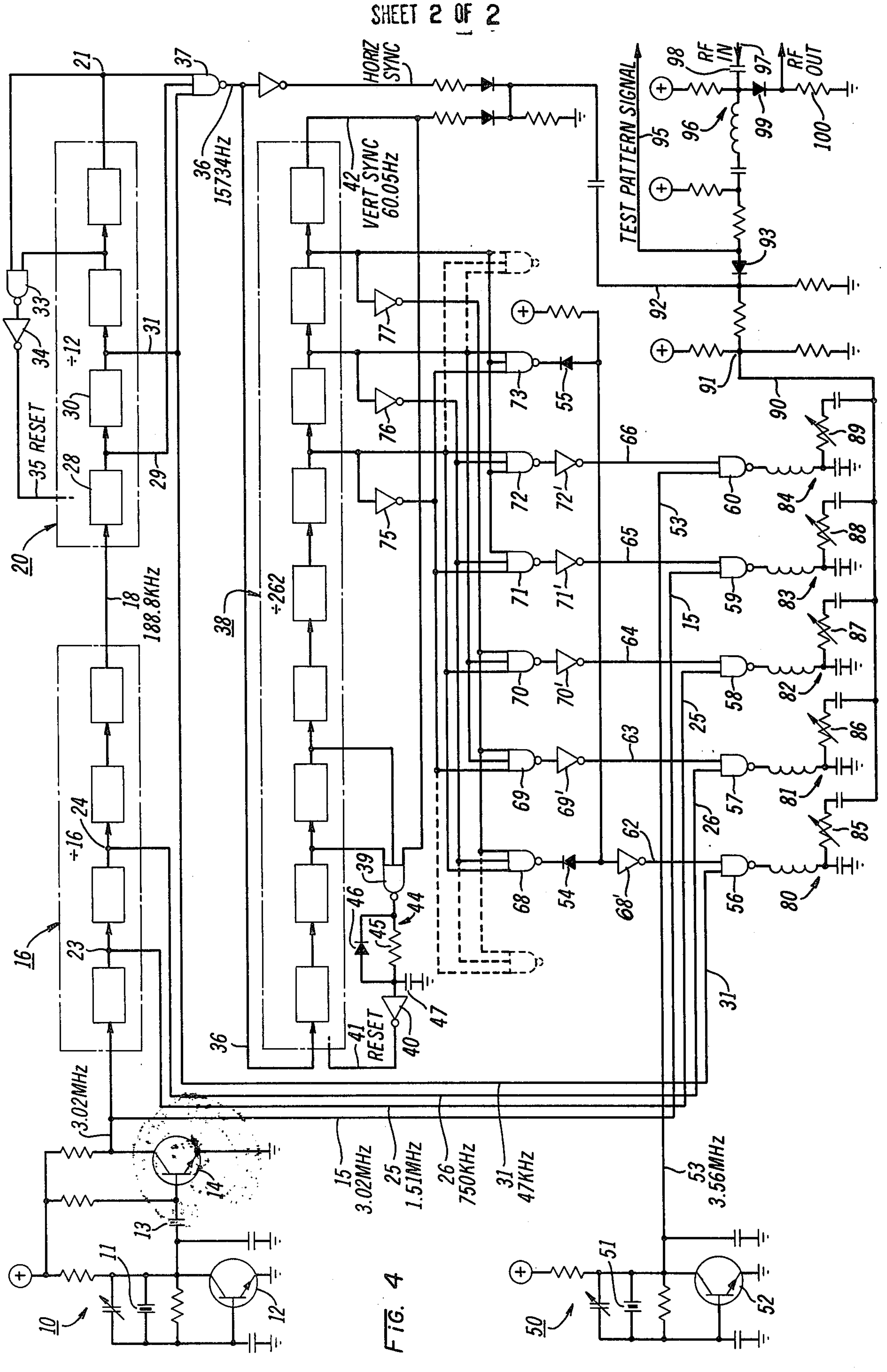
FIG. 4 is a schematic circuit diagram of an electronic test pattern generator embodying the present invention.

Referring now to the drawings and more particularly to FIG. 1 thereof, the video test pattern signal there shown includes a 60 Hz vertical synchronizing pulse, 262 horizontal synchronizing pulses at a frequency of 15,734Hz, and a plurality of equal width, time displaced, discrete bands of video frequencies. The first band has a relatively low video frequency of 47KHz to provide a line of large black and white areas on the receiver screen as shown in FIG. 2. The second band has a frequency of 750KHz which is at approximately the upper left hand corner of a typical I.F. response curve as shown in FIG. 4 and provides a line of vertical bars as shown in FIG. 2. The third band has a frequency at about the middle of the I.F. response curve and, as shown, is at about 1.5 MHz. It provides a line of vertical bars at twice the frequency of the second band. The fourth band has a frequency near the upper right hand corner of the I.F. response curve and is preferably about 3.0 MHz. It provides on the screen a line of vertical bars at a frequency twice that of the third band. A fifth band has a frequency of 3.56 MHz equal to the standard color subcarrier frequency. It has an amplitude twice that of the other video frequency bands so that the line of vertical bars which it produces will have the same intensity as the bars produced by the other video signals. The sixth band is another band having a low video frequency of 47KHz to provide a second line of large black and white reference areas. These video frequency signals are synchronized with the horizontal synchronizing pulses to provide a good visual test of resolution.

It will be observed that the first and last bands of video frequency are spaced by substantial time intervals from the vertical synchronizing pulses thereby to establish gray lines at the top and bottom of the pattern for gray scale reference. While two gray reference areas are helpful, one or the other can be eliminated and replaced with some other suitable frequency such, for example, as 4.5 MHz, the sound carrier frequency.

In order to produce on the television receiver screen the test pattern shown in FIG. 2, the signal of FIG. 1 may be used to modulate an R. F carrier and the modulated signal is then applied to the antenna input terminals of the receiver under test. The carrier may be that of a standard television channel, or it may be at the standard I. F. frequency. The test pattern can also be applied to the video amplifier of the receiver and will still produce the same test pattern. However, the amplitude of the color subcarrier band should be reduced to that of the other video bands if an equal intensity pattern is to be provided.

As an example of the results which can be achieved using the signal of FIG. 1, the tuner of a television receiver can be tested by modulating an R. F. channel frequency carrier and applying it to the input of the tuner and observing the test pattern on the screen of the receiver or on an oscilloscope having its input coupled to the video detector. If the bandpass of the tuner is insufficient, all of the different frequency bands established on the screen of an oscilloscope will not have the same height; either the low or high frequency bands will be shorter than the others. By modulating an I. F.

carrier with the test pattern signal of FIG. 1 the test pattern signal may also be used for rough alignment of a grossly misaligned I. F. stage. This can be accomplished very quickly, but precise alignment requires final adjustment using a sweep generator in the normal manner.

Referring to FIG. 4, there is shown a circuit for electronically generating the test pattern signal of the present invention for producing the visual test pattern illustrated in FIG. 2. A crystal controlled oscillator 10 including a crystal 11 connected between the base and collector of a grounded emitter transistor 12 provides a 302,0960HZ output signal at the collector terminal. This signal is coupled by a capacitor 13 to the base of a grounded emitter transistor 14 where it produces a series of pulses at a frequency of 3.02 MHZ at the collector and on a line 15 connected thereto. This same signal is applied to ripple counter 16 which divides its frequency by sixteen to produce a series of pulses at a frequency of 188.8KHZ at the output terminal 18 thereof. This latter signal is applied to a second ripple counter 20 which divides its frequency by twelve to produce an output signal of 15,734HZ at its output terminal 21. These latter pulses are thus at the horizontal sweep frequency of a standard television receiver.

The ripple counter includes four stages which each divide by two so that in addition to providing the 188.8KHZ output signal at terminal 18, the ripple counter 16 provides at terminal 23 a signal at one-half the frequency of the input signal, i.e., 1.51 MHZ and at terminal 24 a signal at one-quarter the frequency of the input signal, i.e., 750 KHZ. These signals are thus respectively provided on conductors 25 and 26 connected thereto.

The ripple counter 20 employs a 4024CMOS and includes a first flip-flop stage 28 which divides by two to provide on a conductor 29 a 95 KHZ signal and a second flip-flop stage 30 which also divides by two to provide the 47KHZ signal on a conductor 31. In order to cause the counter 20 to divide by 12 rather than by 16, a reset circuit comprising a NAND gate 33 and an inverter 34 is connected to the reset terminal 35 of the counter. The outputs of the third and fourth flip-flop stages of the counter 20 would also each divide the frequency or pulse rate by two and, therefore, both the third and fourth stage outputs go positive on the twelfth input pulse and being connected to the respective inputs of the NAND gate 33 cause the output thereof to go to zero and the output of the inverter 34 to go positive thereby resetting the counter 20 after every twelve input pulses.

The horizontal sync pulses at a frequency of 15,734HZ are obtained by coupling the outputs from the first, second and fourth stages to a three input NAND gate 37. The output of the NAND gate 37, thus goes negative when all three inputs are positive and produces a series of negative pulses at the horizontal sync frequency in synchronism with the video frequency signals derived from the counters 16 and 20.

The output of the NAND gate 37 is coupled by a conductor 36 to the input of a third ripple counter 38 comprising nine cascaded flip-flop stages which each divide by two. A reset circuit including a three input NAND gate 39 and an inverter 40 is connected to the reset terminal 41 of the counter. The outputs of the second, third and ninth stages of the counter 38 all go positive on the 262nd input pulse, whereby the output of the NAND gate 39 goes to zero and the output of the inverter 40 goes positive to reset the counter. Consequently, a series of positive pulses at a frequency of 60.05HZ are developed at the output of the ninth and last stage of the counter 38 and appear on a conductor 42 connected thereto.

In order to insure that the counter 38 will not divide by 261, a possibility when the input pulse is of longer duration than the time it takes the counter to reset, the reset pulse from the NAND gate 39 is widened by means of a pulse stretching circuit 44 so as to have a width greater than that of the input pulses to the counter. The circuit 44 comprises a resistor 45 and a diode 46 connected in parallel between the output terminal of the gate 39 and the input terminal of the inverter 40, and a capacitor 47 connected between ground and the input of the inverter. It will be seen that as soon as the counter resets, the output of the gate 38 will go negative, but the output of the inverter, the reset pulse, remains positive until capacitor 47 charges through the resistor 45 to a voltage level which permits the inverter 40 to switch.

The color subcarrier signal is provided by means of a crystal controlled oscillator 50 including a crystal 51 and a transistor 52 producing a 3.56 MHZ signal on a conductor 53 connected to the collector of the transistor 52. The separate vertical bars produced on the screen by this signal are too close together to be visually discernible and, therefore, there is no need to synchronize this signal with the horizontal sync pulses.

In order to provide equal length, time displaced bands of the video signals provided on the conductors 15, 25, 26, 31 and 53, these video signals are respectively supplied to a plurality of NAND gates 56, 57, 58, 59 and 60 to which a plurality of control signals are supplied via conductors 62, 63, 64, 65 and 66. These control signals are obtained from the outputs at the sixth, seventh and eighth stages of the counter 38 which are applied to a plurality of three input NAND gates 68, 69, 70, 71, 72 and 73 as shown. These same outputs are also inverted in respective ones of a plurality of inverters 75, 76 and 77 and applied to the inputs of the gates 68 – 73 to provide output pulses which are inverted by a plurality of inverters 68′, 69′, 70′, 71′ & 72′ for coupling to the NAND gates 56 – 60. Since the test pattern signal includes two bands of the 47KHZ signal appearing on conductor 31 at gate 56, the gate pulses from both gates 68 and 73 are connected to the inverter 68′ via respective diodes 54 and 55. The signals on the conductors 31, 26, 25, 15 and 53 are thus gated seriatim through the NAND gates 56 – 60 for periods of equal length. It will be apparent to those skilled in the art that the order in which the video signals are gated and appear on the television screen need not be in the order shown but can be arranged in any sequence desired.

Prior to the gating of the initial 47KHZ signal on conductor 31 and immediately following the second gating of that same signal, there are bands of a length equal to those of the video bands and during these two band widths no video signal occurs. This results in the gray areas at the top and bottom of the screen.

Should it be desired to include a video signal in either or both of these vacant bands, control signals therefore can also be obtained from the counter 38 using the two additional gates shown in dotted lines in the drawing.

The outputs of these two, three input NAND gates will be negative during these first and last bands.

These respective output signals from the gates 56 – 60 are coupled through tuned circuits 80, 81, 82, 83 and 84 and level or amplitude adjustment resistors 85, 86, 87, 88 and 89 to a common buss 90. These resistors are adjusted so that the 3.56MHZ signal from gate 60 has an amplitude twice as great as the other four signals which are set to be equal. The composite signal on the buss 90 is applied to a resistive adding network 91 where it is combined with the vertical and horizontal sync pulses on the conductor 92 prior to passing through a clipper diode 93 thereby to provide at terminal 95 the complete test pattern signal illustrated in FIG. 1. This signal is also coupled through an LC filter circuit to a modulator circuit 96 having an RF input terminal 97 coupled through a capacitor 98 to the positive terminal of a modulating diode 99. The modulated RF signal, which may be a TV channel frequency or the standard TV I.F. frequency, is developed across a resistor 100 connected between the negative terminal of the diode 99 and ground.

It may thus be seen that the entire test pattern signal with the exception of the color subcarrier band is derived from the same master oscillator 10 and all of the signals are in mutual synchronism. While the color subcarrier signal at a frequency of 3.56MHZ could also be used as the master or basic signal, the high frequency signal at the upper right hand corner of the I.F. response curve, i.e., about 3MHZ, is not readily obtained from the color subcarrier frequency. Also, the 188.8KHZ signal appearing at terminal 18 of the counter 16 and which may be used as the color gating signal for developing the color pattern is also difficult to derive from the color subcarrier frequency as is a relatively precise horizontal sync signal.

METHOD OF TESTING A TV RECEIVER

In order to test the tuner of a television receiver using the signal generated by the circuit of FIG. 4, an RF signal having a TV channel frequency is applied to the input 97 and the modulated output signal is applied to the input of the tuner. The pattern shown in FIG. 2 should appear on the television screen. The output from the video detector can also be observed on a wide band oscilloscope and should show the same amplitude for all of the frequency bands.

The I.F. and video amplifier can be tested by applying the I.F. frequency to input terminal 97 and connecting the modulated output signal to the input of the I.F. stage of the receiver. The same pattern as shown in FIG. 2 should appear on the television screen. Moreover, the output of the video detector can be observed on a wideband oscilloscope and should show the same amplitude for all of the frequency bands. If not, the I.F. stage is out of alignment.

In order to check the performance of the video amplifier the level control resistor 89 can be adjusted to set the level of the 3.56HZ signal to that of the other signals and the terminal 95 connected to the input of the video amplifier. The test pattern shown in FIG. 2 should appear on the screen of the receiver with the 3.56HZ signal having the same amplitude as the video signals.

Further objects and advantages and a better understanding of the invention may be had from the following detail-description taken in connection with the accompanying drawings, wherein:

What is claimed is:

1. A test pattern generator for use in determining operating characteristics of a color television receiver, means for providing a first signal having a frequency substantially equal to the standard subcarrier frequency, means for providing a plurality of video signals within the I.F. response band of said television receiver, and means for combining said first signal and said video signals to provide a single wave form made up of discrete time displaced bands in which said video signals all have the same amplitude and said first signal has an amplitude twice that of said video signals.

2. A test pattern generator according to claim 1 wherein said plurality of video signals comprise signals having respective frequencies at 750 KHz and 3.0 MHZ.

3. A test pattern generator according to claim 1 further comprising means for providing horizontal and vertical synchronizing signals, means for synchronizing said first signal and said video signals with one of said synchronizing signals, and means for combining said synchronizing signals into said single wave form.

4. A test pattern generator according to claim 3 comprising means for generating another video signal having a sufficiently low video frequency to provide large areas in the displayed pattern for black and white reference.

5. A test pattern generator according to claim 1 wherein said bands are of equal width.

6. A test pattern generator according to claim 1 wherein said single waveform includes a band having no video signal to provide in the displayed pattern a gray reference.

7. A method of testing the bandwidth of a color television receiver, comprising the steps of providing a signal made up of a plurality of discrete, time displaced, equal length bands of respectively different video frequencies all having the same amplitude and a discrete band at a frequency of 3.56 MHz having an amplitude twice that of said video frequencies, and applying said signal to said receiver to provide a video output signal, and applying said video output signal to a cathode ray tube to display a plurality of different lines corresponding to said bands.

8. The method according to claim 7 wherein said signal further includes snyc pulses, and said video frequencies are in synchronism with said sync pulses.

9. The method according to claim 8 wherein said video frequencies are respectively located near the center and the left and right hand upper corners of the standard television I.F. response-curve.

10. The method according to claim 9 wherein said signal further includes a band of a low video frequency signal close to the transmitted carrier frequency.

* * * * *

UNITED STATES PATENT OFFICE

CERTIFICATE OF CORRECTION

Patent No. 3,879,749 Dated April 22, 1975

Inventor(s) ROBERT E. BAUM

It is certified that error appears in the above-identified patent and that said Letters Patent are hereby corrected as shown below:

Claim 1, line 5, after the comma (,) insert --comprising--

Signed and Sealed this

*second* Day of *March 1976*

[SEAL]

*Attest:*

RUTH C. MASON
*Attesting Officer*

C. MARSHALL DANN
*Commissioner of Patents and Trademarks*